Sept. 10, 1957  W. F. TRAUGOTT  2,805,878
IDLER ARM BEARING
Filed Aug. 5, 1953
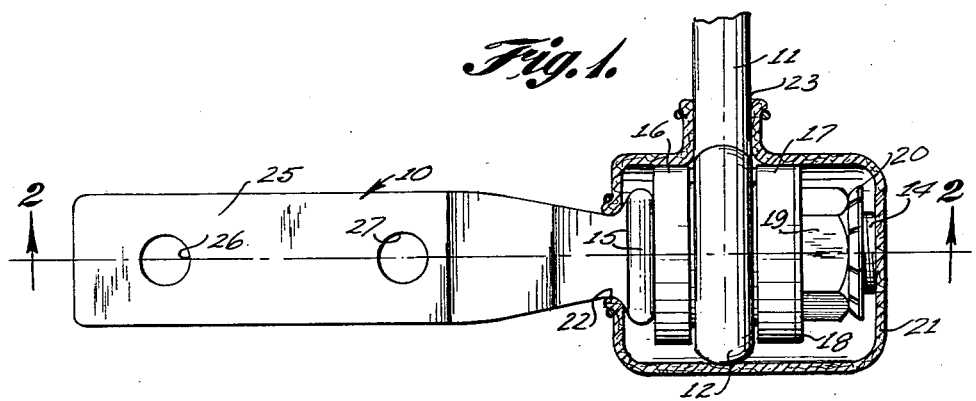
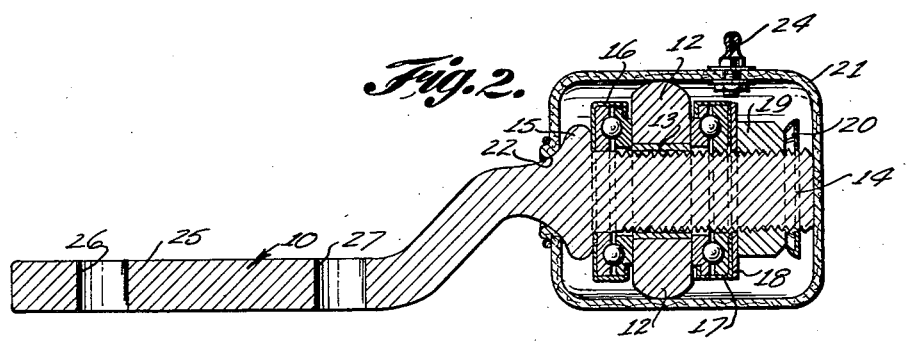
INVENTOR.
Wilfred F. Traugott
BY Victor J. Evans & Co.
ATTORNEYS United States Patent Office 2,805,878
Patented Sept. 10, 1957

2,805,878

IDLER ARM BEARING

Wilfred F. Traugott, West Point, Va.

Application August 5, 1953, Serial No. 372,523

1 Claim. (Cl. 287—93)

This invention relates to motor vehicle steering assemblies and in particular a bearing in the connection between the tie rod and an idler arm wherein friction is reduced to a minimum and wherein the possibility of play developing in the bearing or connection is substantially eliminated.

The purpose of this invention is to eliminate play resulting from wear in swivel connections of motor vehicle steering assemblies and, consequently, substantially eliminate uneven wear on surfaces of motor vehicle tires.

Due to excessive wear developing in tie rod and idler arm connections in steering assemblies of motor vehicles it is difficult to retain the wheels of a vehicle in alignment and in order to prevent uneven wear on motor vehicle tires it is necessary to have the wheels of a motor vehicle aligned at regular periods. Even with the best possible attention a wheel may strike an obstruction that may throw it out of alignment with the result that a tire will wear at one point or on one side. With this thought in mind this invention contemplates a bearing bushing in the bore of an idler arm that is adapted to receive a threaded stud of an idler arm bracket and ball thrust bearings positioned on each side of the idler arm and a boot having a grease fitting therein encasing the joint and preventing grit, dirt and the like working into the bearing.

The object of this invention is, therefore, to provide means for pivotally mounting an idler arm on a supporting bracket whereby the possibility of wear between the parts is substantially eliminated.

Another object of the invention is to provide means for eliminating wear and consequently play in a swivel connection without changing the essential elements of the connection.

A further object of the invention is to provide an improved bearing for pivotally mounting an idler arm on a supporting bracket of a motor vehicle steering assembly to substantially eliminate play in the connections in which the connection is of a simple and economical construction.

With these and other objects and advantages in view the invention embodies an idler arm bracket having a threaded stud extended from a shoulder of the bracket with an idler arm having a bushing therein and having thrust bearings at the sides mounted on said threaded stud with a nut and lock nut.

Other features and advantages of the invention will appear from the following description taken in connection with the drawing, wherein:

Figure 1 is a plan view showing the idler arm and supporting bracket assembly with a boot positioned around the joint shown in section.

Figure 2 is a longitudinal section through the assembly taken on line 2—2 of Fig. 1.

Referring now to the drawing wherein like reference characters denote corresponding parts the improved bearing of this invention is used between an idler arm frame bracket 10 and an idler arm 11 and, as shown in Fig. 2 a hub 12 on the end of the idler arm 11 is provided with a bushing 13 which is journaled on a threaded stud 14 extended from a shoulder 15 on the offset section of the bracket 10. The bearing also includes first and second thrust bearings 16 and 17, respectively, positioned against opposite faces of the hub 12, the bearing 16 being positioned between the hub and shoulder 15 and the bearing 17 between the hub and a washer 18 that is secured in position with a nut 19 and a lock nut or washer 20.

The nut 19 and washer 20 are threaded on the stud 14 and with the parts clamped in assembled relation it is substantially impossible for play to develop in the connection or bearing.

The connection is covered with a boot 21 of leather or other suitable material with the bracket 10 extended through an opening 22 of the boot and the idler arm extended through a similar opening 23. The boot is also provided with a grease fitting 24 whereby grease is maintained on the interior of the boot.

It will be understood that although bearings of the single row type are illustrated in the drawing double row bearings may be used and it will also be understood that the bearings may be of any other suitable type.

The bracket 10 is provided with a base 25 through which spaced openings 26 and 27 extend.

With the idler arm mounted on the threaded stud of the idler arm frame bracket in this manner the only points where one surface moves in relation to another are in the ball bearings and as the life of a ball bearing is indefinite the possibility of wheels of a motor vehicle being out of alignment due to parts wearing in the steering connections is substantially eliminated. The wear in a ball bearing is very slight, however this may be taken up with the nut 19 and lock washer 20.

It will be understood that modifications, within the scope of the appended claim, may be made in the design and arrangement of the parts without departing from the spirit of the invention.

What is claimed is:

In a motor vehicle steering gear assembly, the combination which comprises an idler arm having a hub with a bore therethrough on one end, an idler arm frame bracket having a threaded stud extended from a shoulder on one end positioned with the stud extended through the bore of the hub of the idler arm, a bushing mounted in the bore of the hub of the idler arm and rotatably mounted on the threads of the stud, a first bearing positioned between one face of the hub of the idler arm and the shoulder of the bracket, a second bearing positioned against the face of the hub opposite to the face against which the former bearing is positioned, a nut threaded on the extended end of the stud for retaining the parts in assembled relation, locking means securing the nut in position with the parts assembled, and a boot of flexible material encasing said assembly.

References Cited in the file of this patent

UNITED STATES PATENTS

| 1,397,413 | Evans | Nov. 15, 1921 |
| 1,983,655 | Bowman et al. | Dec. 11, 1934 |

FOREIGN PATENTS

| 18,328 | Australia | of 1934 |
| 819,915 | Germany | of 1949 |